United States Patent [19]

Couderc et al.

[11] Patent Number: 5,102,065
[45] Date of Patent: Apr. 7, 1992

[54] SYSTEM TO CORRECT THE TRAJECTORY OF A PROJECTILE

[75] Inventors: Georges Couderc, Bures Sur Yvette; Jean-Louis Meyzonnette, Jouy-en-Josas; Christian Pepin, Gif-Sur-Yvette; Robert Pressiat, Ville D'Avray, all of France

[73] Assignee: Thomson - CSF, Puteaux, France

[21] Appl. No.: 427,104

[22] PCT Filed: Feb. 17, 1988

[86] PCT No.: PCT/FR89/00060

§ 371 Date: Oct. 13, 1989

§ 102(e) Date: Oct. 13, 1989

[87] PCT Pub. No.: WO89/07744

PCT Pub. Date: Aug. 24, 1989

[30] Foreign Application Priority Data

Feb. 17, 1988 [FR] France .................. 88 01858

[51] Int. Cl.$^5$ .................. F41G 7/26
[52] U.S. Cl. .................. 244/3.11; 244/3.13; 244/3.16
[58] Field of Search .................. 244/3.11, 3.13, 3.16

[56] References Cited

U.S. PATENT DOCUMENTS

| | | | |
|---|---|---|---|
| 3,567,163 | 3/1971 | Kepp et al. | 244/3.14 |
| 3,796,396 | 3/1974 | Crovella | 244/3.14 |
| 4,389,647 | 6/1983 | Fanuele et al. | 342/192 |
| 4,676,455 | 6/1987 | Diehl et al. | 244/3.13 |
| 4,696,441 | 9/1987 | Jones et al. | 244/3.13 |
| 4,709,875 | 12/1987 | Cremosnik et al. | 244/3.13 |
| 4,721,270 | 1/1988 | Salkeld | 244/3.11 |
| 4,732,349 | 3/1988 | Maurer | 244/3.13 |
| 4,750,688 | 6/1988 | Davies | 244/3.11 |
| 4,768,736 | 9/1988 | Morten et al. | 244/3.11 |
| 4,898,340 | 2/1990 | Kliger et al. | 244/3.11 |
| 4,901,946 | 2/1990 | Arnaud et al. | 244/3.13 |
| 4,925,129 | 5/1990 | Salkeld et al. | 244/3.11 |

FOREIGN PATENT DOCUMENTS 151480 8/1985 European Pat. Off. .
2129948 11/1972 France .
2351419 12/1977 France .

OTHER PUBLICATIONS

Nachrichtentechnische Zeitschrift, vol. 30, No. 3, 1977, U. Raudonat et al: "Mehrzielfähiges FM-CW-Radar zur eindeutigen Messung van Entfernung und Geschwindigkeit", pp. 255–260, see entire document.

Primary Examiner—John B. Sotomayor
Attorney, Agent, or Firm—Cushman, Darby & Cushman

[57] ABSTRACT

A system for correcting the trajectory of a projectile so that it reaches a designated target. The system comprises an optical radar comprising a laser emitting in the infrared band that makes it possible, in association with a processing device, to follow the movements of the target and of the projectile at the same time. The pieces of information given by the processing device enable a computer to calculate corrections to be made to the trajectory of the projectile in a final stage so that it meets the target. By modifying the trajectory of a projectile, such as a self-propelled missile or a shell, launched towards a target, the projectile can be made to hit a moving target or pass by at a reasonable distance that is small enough for the explosion provoked by its charge to definitely destroy the target.

10 Claims, 5 Drawing Sheets

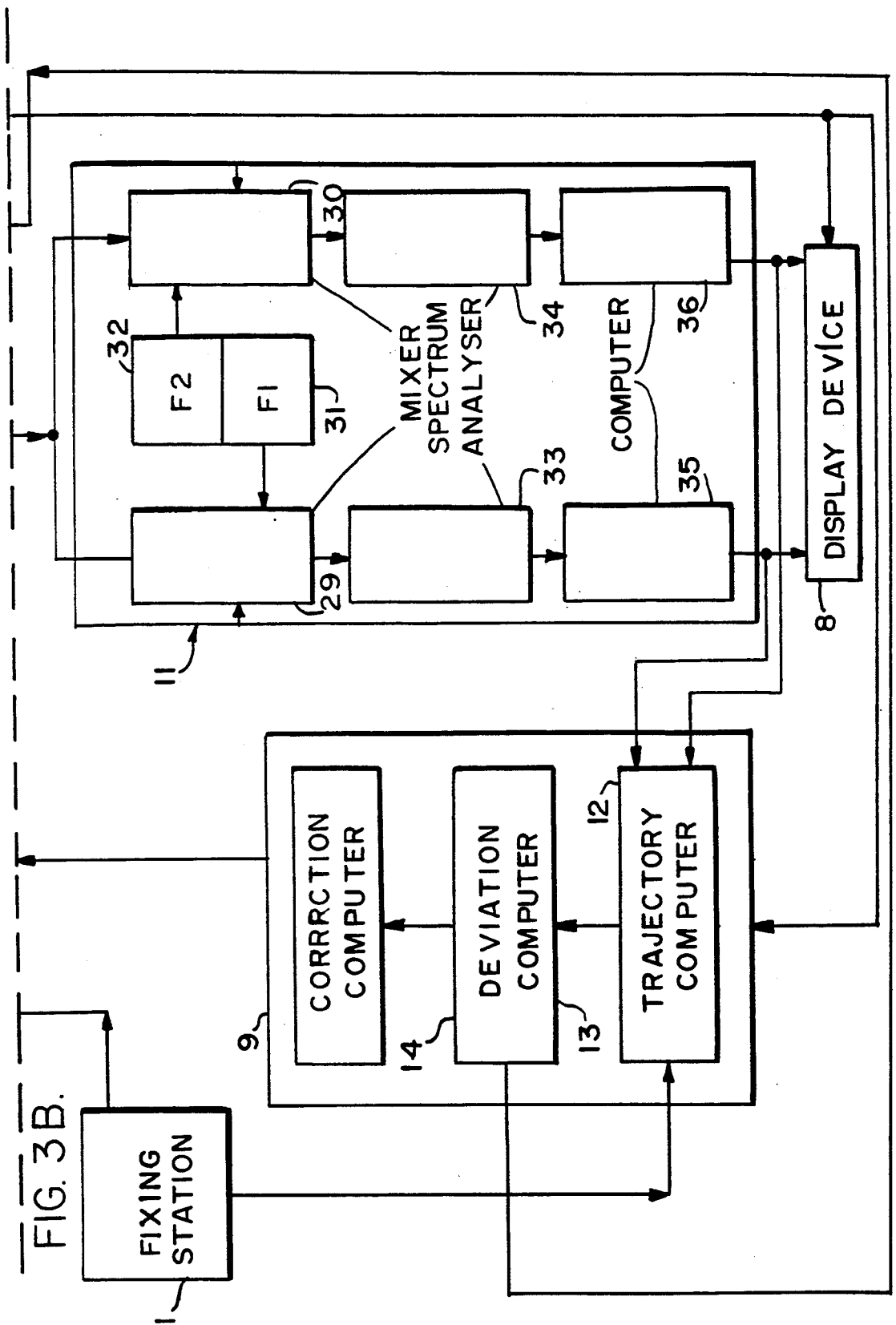

SYSTEM TO CORRECT THE TRAJECTORY OF A PROJECTILE

FIELD OF THE INVENTION

The invention concerns a system enabling the trajectory of a projectile to be corrected so that it reaches its designated objective.

BACKGROUND OF THE PRIOR ART

There are many systems that are designed so that a projectile, such as a shell, a rocket or, again, a missile reaches an objective or target such as an aircraft, a helicopter or a tank. These systems differ from one another according to the target to be reached and according to the projectile used. Thus, for a high-speed target such as an aircraft, it is preferred to use a self-guided missile which, after being launched towards the target, moves by itself towards the target in modifying its initial trajectory by means of pieces of information supplied to it by an onboard radar, the antenna of which is pointed towards the target.

Self-guided missiles such as this give satisfactory results, but cost very much, and their cost is acceptable only for the destruction of even costlier targets located at relatively big distances of more than five kilometers. Beyond this distance, it is often the practice to use missiles or rockets that are directed towards their objective by means of pieces of information provided by the firing station, these pieces of information having the purpose of preserving the firing station-missile-target alignment irrespectively of the movements of the latter.

Shells fired by guns or mortars are also used, and have the advantage of being inexpensive and light, of having a high initial velocity and of being capable of being fired at a high rate. However, they have the major drawback wherein their trajectory, which is ballistic, can no longer be modified after they are launched. The result thereof is that hits are less frequent than with guided missiles, for the target may move erratically during the trajectory of the shell. Furthermore, the real trajectory of the shell may be different from the theoretical trajectory, owing to the variation in certain parameters such as the speed and direction of the wind, the quality of the solid propellent etc.

To improve the hitting efficiency of shells, as well as that of missiles and rockets, notably against so-called light targets, namely targets with relatively little shielding, these projectiles are provided with "proximity fuses" which set off the explosive charge when they pass in the vicinity of the target. To be efficient, the charge must explode at a relatively small distance, for example a distance of a few meters; now, with the uncertainties of the trajectory of the projectile and of the movement of the target, the projectile often goes to a distance which is greater than the planned triggering value.

An object of the present invention, therefore, is to make a system enabling a modification of the trajectory of a projectile, notably a shell, launched towards a target in such a way that it reaches it or passes by at a distance that is small enough for the explosion provoked by its charge to definitely destroy the target.

The French patent application No. 2 129 948, describes a prior art guidance system comprising, a radar emission and reception means to measure the position and radial velocity of the objective and of the projectile, a computation means to compute a nominal trajectory of the projectile, such that it reaches the objective, as well as its real trajectory, on the basis of pieces of information on position and radial velocity of the objective and the projectile, a computation means to compute the deviations between the real trajectory of the projectile and its nominal trajectory, a computation means to compute the corrections to be applied to the real trajectory of the projectile so that the projectile reaches the objective, a radio transmitter to transmit the corrections to be applied to the projectile and a radio reception means and control means to apply the correction systems, placed on board the system.

This system has the drawback of being sensitive to radio jamming signals emitted by the objective aimed at.

SUMMARY OF THE INVENTION

The object of the present invention is to propose a system that is better protected against jamming signals emitted by the designated objective.

According to the present invention, a system is shown capable of correcting the trajectory of a projectile so that it reaches an objective that is designated for it by a firing station having launched it. The system having an emission and reception means to measure the position and radial velocity of the objective and of the projectile, a first computation means to compute a nominal trajectory of the projectile, such that it reaches the objective, as well as its real trajectory, on the basis of pieces of information on position and radial velocity of the objective and of the projectile, a second computation means to compute the deviations between the real trajectory of the projectile and its nominal trajectory, a third computation means to compute corrections to be applied to the rear trajectory of the projectile so that the projectile reaches the objective, a means to transmit the correction to be applied to the projectile, a reception and control means to apply said corrections, placed on board the vehicle. The emission and reception means to measures the position and radial velocity of the designated objective and of the projectile with an optical radar. The means to transmit corrections comprises means for encoding a laser beam emitted by the optical radar.

Other characteristics and advantages of the present invention will appear from a reading of the detailed description of a particular embodiment and the description of the appended drawings.

BRIEF DESCRIPTION OF THE DRAWINGS

FIGS. 3, 3a, 3b are functional diagrams of the ground equipment of a system for correcting the trajectory of a projectile according to the invention;

DETAILED DESCRIPTION OF THE PREFERRED EMBODIMENTS

Figure 1:
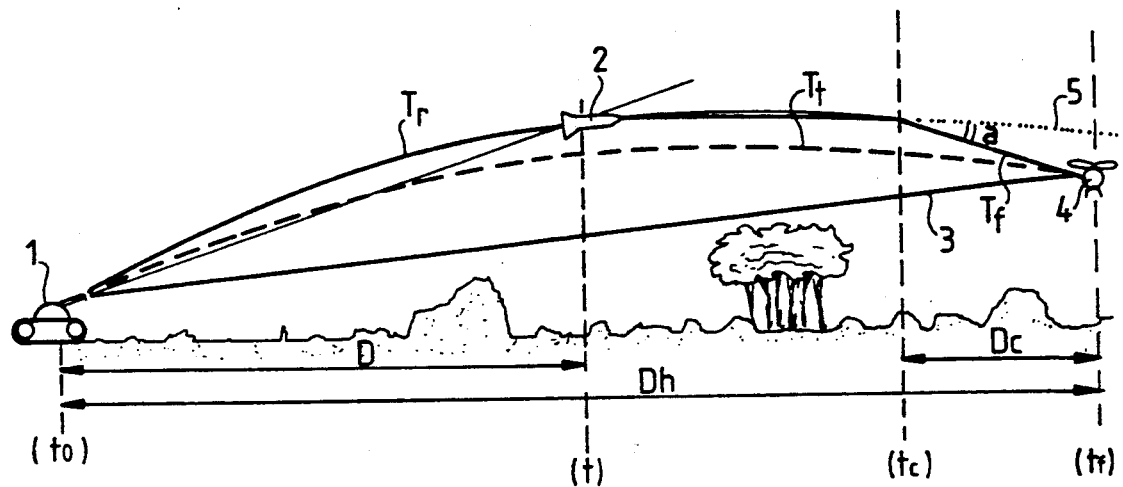
FIG. 1 is a diagram illustrating, in a vertical plane, the different trajectories to be computed and measured.
Figure 2:
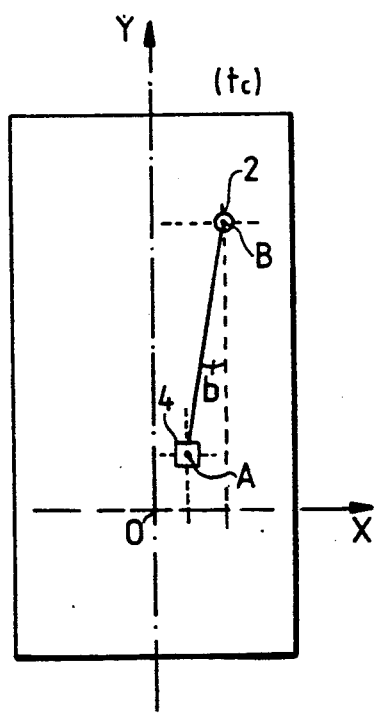
FIG. 2 is a diagram illustrating the measurements of deviation along a vertical axis and a horizontal axis.

The diagrams of FIGS. 1 and 2 indicate the different parameters and pieces of information to be taken into account to understand the system for correcting the trajectory of a projectile launched from a firing station 1. For example, this firing station is a tank armed with a gun that fires a shell 2 towards an objective that takes the form of a helicopter 4 located at a horizontal distance Dh from the firing station 1. The parameters of the firing have been determined by ballistic means that are external to the object of the invention, so that the shell 2 reaches the helicopter 4 along a theoretical trajectory Tt shown in the vertical plane of FIG. 1, containing the firing station 1 and the helicopter 4. In this vertical plane, the optical axis of vision takes the form of the straight line 3 connecting the firing station 1 and the helicopter 4.

Owing to various factors (the temperature of the solid propellent, aerological conditions, winds etc.) the trajectory of the shell deviates from its theoretical trajectory Tt, which is known at every instant by tables or by computation, to follow a real trajectory Tr which does not end in impact with the helicopter 4; this is the case all the more so as, during the trajectory of the shell (some seconds) the helicopter 4 has moved and is in a position other than the one corresponding to the theoretical trajectory.

The system of the invention makes a computation first, at the firing station, of the correction to be made to the real trajectory Tr of the shell at a horizontal distance Dc from the helicopter 4 so that the shell 2 reaches the helicopter 4 or, at least, passes by a sufficiently small distance to be in the zone of action of the explosive charge triggered by a proximity fuse. Then, this piece of information on correction is sent to the shell 2 which has the capability to modify its trajectory at the distance Dc, i.e. at a distance tc measured from an instant to of the firing of the shell. In FIG. 1, this correction takes the form, in the vertical plane, of an angle a between the tangent 5 to the real trajectory Tr at the instant tc of the correction (distance Dc from the helicopter) and the tangent to the final trajectory Tf leading to impact with the helicopter 4.

It is clear that this angular correction a in the vertical plane does not suffice for neither the helicopter 4 nor the shell 2 are in the vertical plane of the FIG. 1 at the instant of correction tc, this plane being that of the firing instant.

Thus, as FIG. 2 shows, the helicopter 4, which was in the vertical plane taking the form of the axis OY, is located at the point A at the instant tc while the shell 2 is located at the point B, the helicopter and the shell being separated by the horizontal distance Dc. There is therefore reason to also make a horizontal angular correction b so as to bring the shell in the vertical plane passing through A.

When the corrections a and b have been computed, the system is designed to encode these pieces of information on correction and send them to the shell. To this effect, the shell has capability enabling it to receive the pieces of information and apply them in order to deflect its trajectory towards the helicopter.

Figure 3:
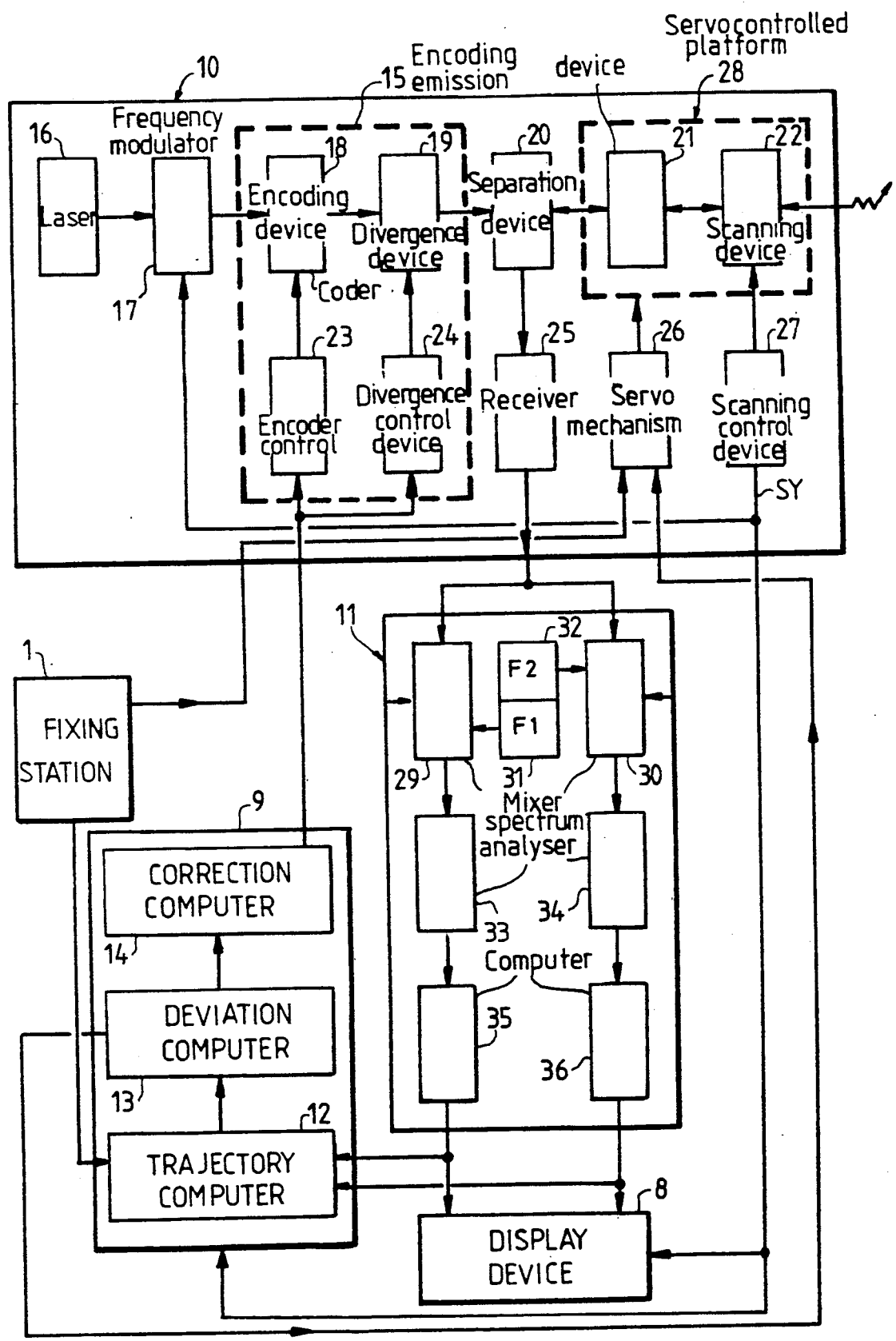
Figure 3A:
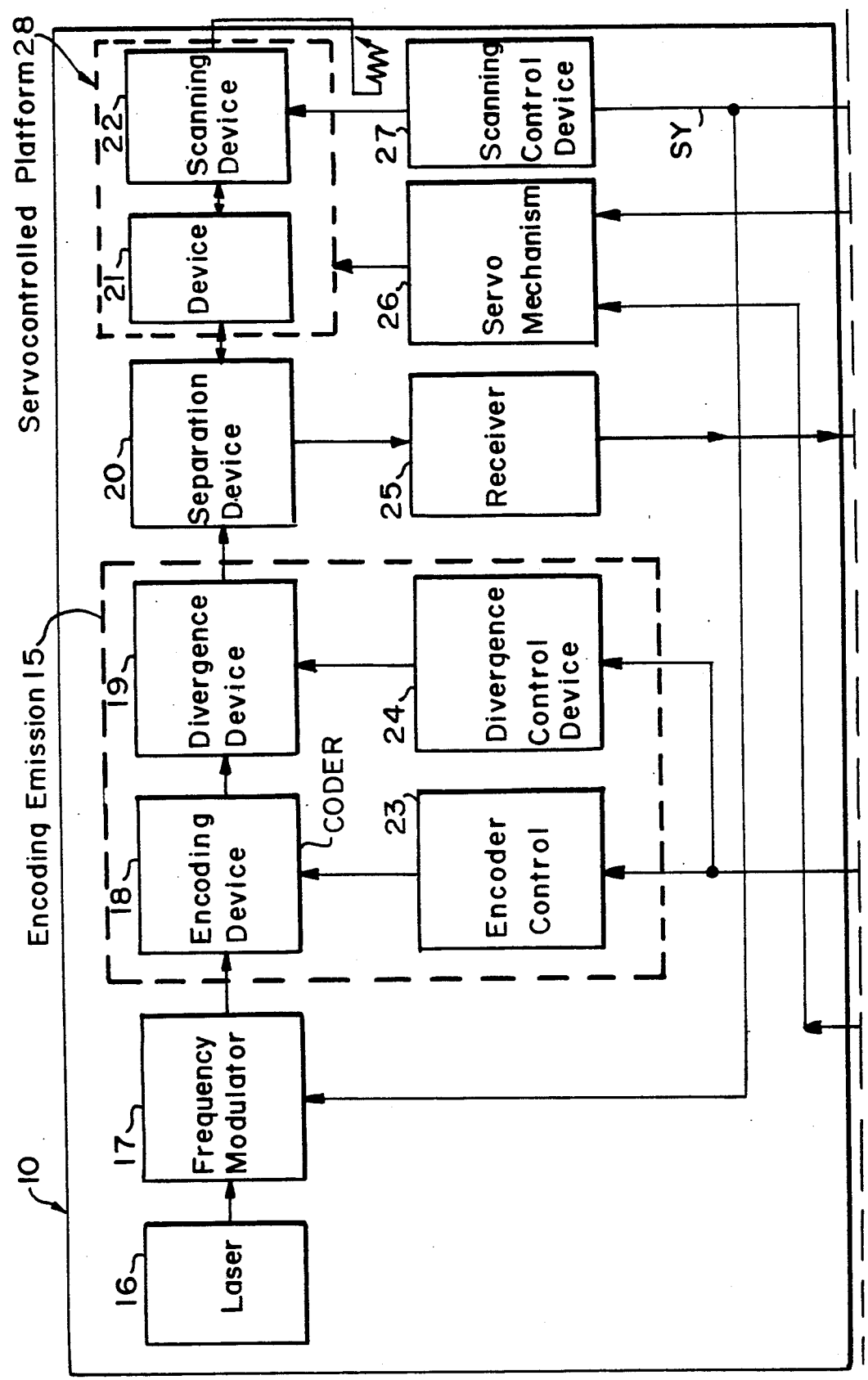

The system for correcting the trajectory of a projectile according to the invention comprises, in fact, two distinct devices or items of equipment: one at the firing station 1 and the other aboard the shell 2 or projectile. The equipment at the firing station shall be described with the help of the functional diagram of FIG. 3 and the onboard equipment shall be described with the help of the functional diagram of FIG. 5.

The equipment added on to the firing station 1 comprises, very schematically, an optical radar set having a laser transmitter with frequency modulation and a coherent receiver, a device 11 for processing the signals received in two channels, one of which corresponds to the shell and the other to the helicopter so as to measure, for each of them, their instantaneous distance D with respect to the firing station and their instantaneous radial velocity Vr, a device 8 for the display of the processed signals and of the corresponding pieces of information on distance and radial velocity, a computer 12 of the nominal and real trajectories of the shell, a computer 13 of the deviations between the nominal and real trajectories of the shell, a computer 14 of the corrections a and b to be made in the trajectory of the shell as a function of the value of these deviations and a device 15 for the encoding and emission of the pieces of information on correction computed by the device 14, which is integrated into the radar 10. The different computers 12, 13 and 14 form a a set 9 for the computation of the corrections to be made in the real trajectory of the shell so that it reaches the helicopter.

The optical radar unit 10, with the exception of the encoding device 15, has been described, for example, in the SPIE Proceedings Volume 783 and consists, for example, of a laser emitter 16 that emits a coherent wave that can be located in the infrared band. A $CO_2$ laser with a wavelength of 10.6 microns can be used. The infrared beam is applied to a frequency modulator 17 which achieves a linear frequency modulation of the type illustrated by the curve 40 of FIG. 4. This frequency modulated infrared signal is applied to the encoding and emission device 15, the different elements of which shall be described further below. The device 15 does not modify the characteristics of the emitted infrared beam when it is not activated, that is, during the greatest part of the operating time of the system.

The infrared beam, upline, goes through a separation device 20 which transmits the greatest part of the emitted beam towards an optical device 21, and the rest towards a coherent receiver 25. The radiation received, corresponding to that of emission, is on the contrary entirely directed towards the coherent receiver 25. A scanning device 22 achieves a shift of the infrared beam according to a relationship determined so as to explore a certain field to observe both the shell and the helicopter. This can be covered, for example, according to a line-by-line scan which covers a solid angle having an aperture of about one to two degrees. The scanning device 22 is controlled by a circuit 27 which moreover gives synchronization signals SY to the modulator circuit 17, the display device 8 and the trajectory computer 12.

The devices 21 and 22 are located on a platform 28 which is oriented and servo-controlled in azimuth and in elevation by a servo mechanism 26 so as to keep the shell and the helicopter in the solid angle of the optical scanning. To this effect, the servo mechanism 26 receives signals from the firing station 1, notably at the moment when the shell is fired, and from the deviations computer 13. The purpose of the signals coming from the firing station 1 is to point the servo-controlled platform 28 towards the helicopter or the shell so that the optical radar unit 10 gets locked into one of these elements to be tracked. The signals coming from the deviations computer 13 are aimed at keeping the shell and the helicopter in the solid angle of scanning when they tend to move away from it.

The output signals of the receiver 35 contain both pieces of information concerning the helicopter and other pieces of information concerning the shell. In order to separate them, these signals are applied to the processing device 11 which comprises two identical channels, one allocated to the signals coming from the shell and the other allocated to the signals coming from the helicopter. The separation is got by means of a mixer circuit 29 which receives, from an oscillator circuit 31, a signal having a frequency Fl, and a mixer circuit 30 which receives, from an oscillator circuit 32, a signal having a frequency F2 that is appreciably higher than Fl. The frequencies Fl and F2 are the reflection of the Doppler shift frequencies of the helicopter and the shell. In effect, the helicopter 4 has a radial velocity which is of the order of some tens of meters per second and rarely goes beyond 100 m/s while the radial velocity of the shell 2 varies between 500 m/s and 1200 m/s, and very different Doppler frequencies result therefrom.

In making a judicious choice of the frequency Fl and F2 values, the signals of the shell and of the helicopter are separated by their distinct Doppler shifts and, secondly, these signals can be easily transposed to frequencies enabling them to be processed by two identical channels. It is thus that the transposed signals are applied to a spectrum analyzer 33, 34 in series with a computer 35, 36 which computes the distance D and the radial velocity Vr of the shell for one channel and that of the helicopter for the other channel.

Figure 4:
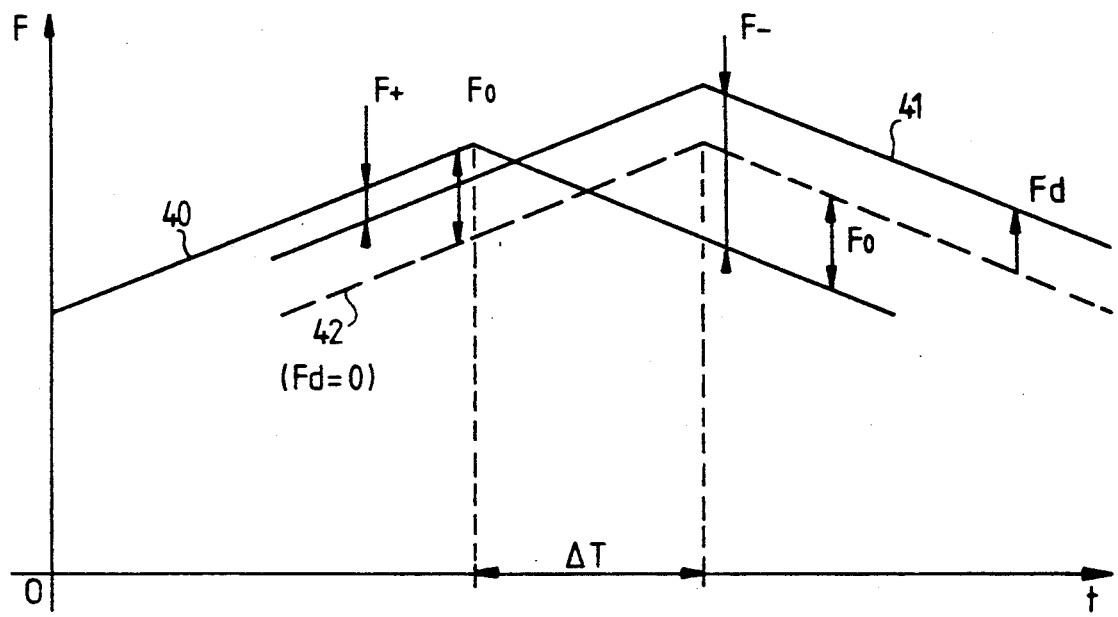
FIG. 4 is a time/frequency graph showing the shape of the signals emitted and received.

FIG. 4 illustrates the mode of computation of the distance and of the radial velocity, the principle of which is considered as being known and shall, therefore, be recalled only briefly. In this diagram, the frequency of the wave emitted 40 varies linearly as a function of time, according to a saw-toothed form, both sides of which are symmetrical. The wave 41 received from an object varies linearly in frequency but is shifted with respect to the Doppler frequency value Fd according to the formula: $Fd = 2Vr/e$ where e is the wavelength of the laser 16. The curve in dashes 42, shifted by $\Delta T$ with respect to 41 as a function of the instantaneous distance of remoteness D, corresponds to the wave received for a null Doppler frequency, that is Fd=0. This graph enables the deduction of the relationships:

$$D = c/4K \, (F^- + F^+) \text{ and } Vr = e/2 \, (F^- - F^+)$$

where c is the speed of the light, K is the speed of variation of the frequency, $F^+ = Fo - Fd$ and $F^- = Fo + Fd$, Fo being the maximal excursion of the frequency of the wave emitted due to the modulation in the modulator 17.

The respective pieces of information on the distances D and on radial velocity Vr, coming from the computers 35 and 36, are given, firstly, to the display device 8 and, secondly, to the trajectory computer 12. The display device 8 makes an image of the shell and that of the helicopter appear on the screen according to a system of appropriate coordinates. The deviations computer 13 performs a certain number of operations on the pieces of information supplied to obtain the deviations according to these appropriate coordinates. Using these deviations, the computer gives the corrections to be made to the trajectory of the shell so that, in the final stage Tf, it reaches the helicopter 4 for which the parameters of position and movement are known.

More precisely, these corrections consist in determining the maneuvers to be performed by the shell and they therefore depend on the type of directional elements with which the shell is fitted out. These directional elements could be small explosive charges placed on the periphery of the shell or, again, the rudders of a tail unit which would get deployed immediately upon leaving the gun. In the case of self-propelled projectiles, the modifications of the trajectory could be obtained by the orientation of one or more nozzles, but also by rudders or, again, by explosive charges. Irrespectively of the directional elements used, the projectile 14 should know its roll, that is, its angular rotational speed, so that the correction is done in the desired direction.

To send the shell the orders for correcting its trajectory, whatever may be their varyingly elaborate form, the system includes the device 15 which comprises, firstly, a device 18 for encoding the emitted beam and, secondly, a device 19 to modify the deviation of the emitted beam, these two devices 18 and 19 being controlled respectively by control circuits 23 and 24 that receive corresponding pieces of information from the corrections computer 14. The purpose of the divergence device 19 is to widen the emitted laser beam so that it definitely illuminates the shell 2. A device 19 such as this may be eliminated should there be means provided to shift the emitted beam and to make it illuminate the shell during the transmission of the commands. For example, the scanning device 22 may receive, from the computation set 9 through the scan control 27, a command to stop scanning, on the one hand, and a command for orientation towards the shell, on the other hand. The encoding device 18 may be of the all-or-nothing type, for example with total occultation by a shutter.

Figure 5:
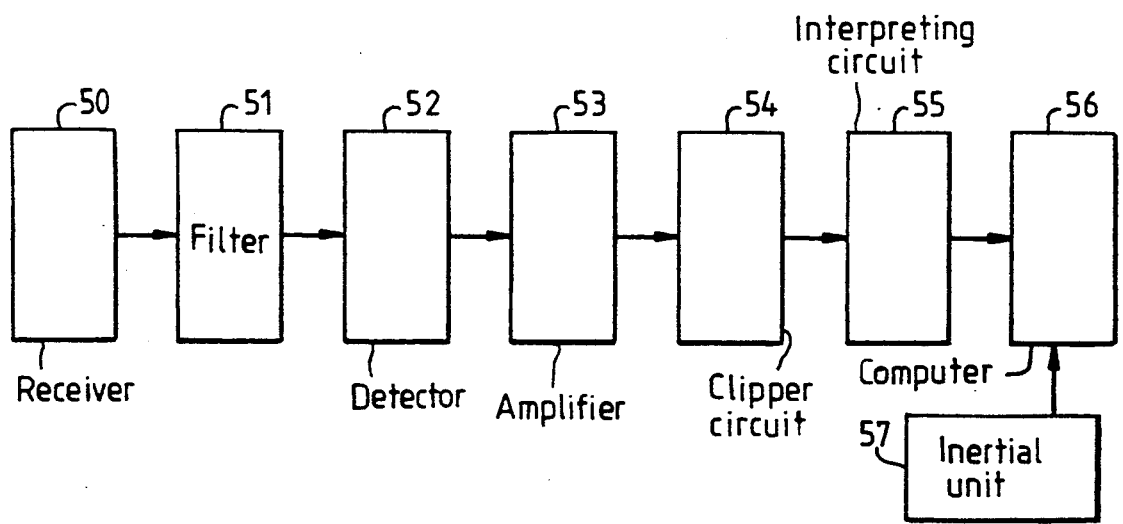
FIG. 5 is a functional diagram of the onboard device of the system for correcting the trajectory of a projectile according to the invention.

To receive and interpret the correction code transmitted by the laser beam, the onboard equipment of the projectile comprises, as can be seen from the functional diagram of FIG. 5, a optical device 50 for the reception of the radiation emitted by the equipment 10, a filter 51 suited to the emitted wave, a detector-preamplifier 52 of the filtered radiation, a pass-band amplifier 53, a clipper circuit 54, a circuit 55 for the interpreting of the correction code and a computer 56 of the commands to be made on the directional elements to obtain the desired correction. To perform this computation, the computer 56 is connected to an inertial unit 57 which, for its part, gives, on the one hand, the reference of the vertical and, on the other hand, the roll of the shell.

For the shell to be more easily detectable by the laser radar, its rear face includes a back-reflector element, not shown, which sends the laser beam back towards the firing station.

The operation of the system for correcting the trajectory of the shell is then the following. As soon as the shell has been fired towards the helicopter 4, the firing station 1 uses the servo-mechanism 26 to command the bi-axial positioning of the platform 28 so that the optical axis of the laser beam is pointed towards the helicopter 4. This enables the radar set 10 to detect the helicopter and to display its parameters on the display device 8. When the shell penetrates the solid angle of scanning of the laser beam, it is detected and displayed on the display device 8 at the same time as the helicopter 4.

It is then that the trajectory computer 12, which has also received, from the firing station 1, the initial parameters of the shell, computes the theoretical or nominal trajectory as well as the real trajectory of the shell on the basis of the parameters that it measures by the corresponding processing channel (circuits 30, 34, 36). The computer 13 computes the deviations between the two trajectories, thus enabling the computer 14 to compute the corrections to be made to the real trajectory of the shell should the helicopter be stationary. Should it not be so, the deviations are computed between the real trajectory and the nominal trajectory leading to impact, a nominal trajectory that depends on the measurement of the parameters of movement of the helicopter. When the shell and the helicopter are no longer separated by any other than a predetermined or computed horizontal distance Dc, the corrections to be made are sent to the shell by the encoding of the laser beam by means of the device 15. At the same time, the laser beam is made more divergent by means of the devices 24 and 19 so as to illuminate the shell. On the shell, the correction code is detected and interpreted before being implemented in the computer 56 to command the directional elements of the shell in order to direct it towards the point of impact.

The equipment associated with the firing station has been described with a processing device 11 comprising two parallel channels. It is possible to have only one channel which would sequentially and alternately process the signals received from the shell, and then those received from the helicopter. In this case, a single mixer would enable the frequencies F1 and F2 signals to be applied to this mixer. The output signals of this mixer would then be applied to a single analyzer followed by a single computer of the parameters D and Vr. An approach such as this can be envisaged only if the computer has a sufficiently high computation speed.

The invention has been described in relation to a shell fired by a gun, but it is clear that it can be applied to all other projectiles, notably to a self-propelled missile.

We claim:

1. A system for correcting the trajectory of a projectile launched from a firing station so that it reaches a designated target, the system comprising:

means for measuring a first position and radial velocity of the target and a second position and radial velocity of the projectile, the first and second positions and velocities varying as a function of the position of the target and the projectile, respectively, relative to an optical radar unit;

first computation means for computing a nominal trajectory of the projectile and a real trajectory of the projectile in accordance with the measurements of the first position and radial velocity and the second position and radial velocity;

second computation means for computing deviations between the real trajectory and the nominal trajectory computed by the first computation means;

third computation means for computing corrections, based on the computed deviations, to be transmitted to the real trajectory of the projectile when the projectile is separated a predetermined distance Dc from the target;

means for transmitting the corrections to the projectile by encoding a laser beam to be transmitted by the optical radar unit; and reception control means attached to the projectile for receiving the corrections and further comprising means for altering the trajectory of the projectile at the predetermined distance Dc so as to intercept the target relative to its first position and radial velocity.

2. The system of claim 1, wherein the means for measuring first and second positions and radial velocities comprises:

means for separating signals received from the target from signals received from the projectile;

means for measuring the frequencies of these respective signals separately; and computation means for computing the position distance D and the radial velocity Vr for both the target and the projectile using the measured frequency values.

3. The system of claim 2, wherein the means for separating signals received from the target from those received from the projectile comprises two mixer circuits for respectively receiving the separated signals having frequencies (F1), (F2) corresponding to different Doppler frequencies to be detected.

4. The system of claim 2, wherein the means for measuring the frequencies of the signals received comprises at least one spectrum analyzer.

5. The system of claims 1, 2, 3, or 4, wherein the first, second and third computation means form a computer set which computes angular information for correcting the trajectory of the projectile with respect to a plane of reference.

6. The system of claim 1, wherein the means for transmitting the corrections comprises means for widening the emitted laser beam so as to preserve the illumination of the projectile during transmission of the corrections.

7. The system of claims 1, 2, 3, 4, or 6, wherein the reception control means comprises:

receiver means for receiving the encoded laser beam;

a circuit for decoding the encoded laser beam;

computing means for controlling directional elements of the projectile in response to decoded laser beam signals; and an inertial unit for giving a reference direction to the computing means.

8. The system of claim 7, wherein the projectile comprises a back-reflector which returns optical radar emitted signals back to the firing station.

9. The system of claim 5, wherein the reception control means comprises:

receiver means for receiving the encoded laser beam;

a circuit for decoding the encoded laser beam;

computing means for controlling directional elements of the projectile in response to decoded laser beam signals; and an inertial unit for giving a reference direction to the computing means.

10. The system of claim 9, wherein the projectile comprises a back-deflector which returns optical radar emitted signals back to the firing station.

* * * * *